United States Patent
Conan et al.

(10) Patent No.: US 11,234,032 B2
(45) Date of Patent: Jan. 25, 2022

(54) METHOD OF MANAGING THE RIGHT OF ACCESS TO A DIGITAL CONTENT

(71) Applicant: ORANGE, Paris (FR)

(72) Inventors: Martin Conan, Cesson Sevigne (FR); Xavier Le Guillou, Chateaugiron (FR)

(73) Assignee: ORANGE, Paris (FR)

(*) Notice: Subject to any disclaimer, the term of this patent is extended or adjusted under 35 U.S.C. 154(b) by 0 days.

(21) Appl. No.: 15/529,477

(22) PCT Filed: Nov. 26, 2015

(86) PCT No.: PCT/FR2015/053227
§ 371 (c)(1),
(2) Date: May 24, 2017

(87) PCT Pub. No.: WO2016/087750
PCT Pub. Date: Jun. 9, 2016

(65) Prior Publication Data
US 2017/0264932 A1    Sep. 14, 2017

(30) Foreign Application Priority Data
Dec. 4, 2014    (FR) ...................................... 1461921

(51) Int. Cl.
*H04N 7/16*    (2011.01)
*H04N 21/254*    (2011.01)
(Continued)

(52) U.S. Cl.
CPC ......... *H04N 21/2541* (2013.01); *G06F 16/43* (2019.01); *G06F 21/10* (2013.01);
(Continued)

(58) Field of Classification Search
CPC .... G06F 17/30023; G06F 21/00; G06F 21/10; G06F 21/335; G06F 21/44;
(Continued)

(56) References Cited

U.S. PATENT DOCUMENTS

| | | | | |
|---|---|---|---|---|
| 7,930,703 B2 * | 4/2011 | Jureczki | ............ | H04N 21/4135 |
| | | | | 719/321 |
| RE48,194 E * | 9/2020 | Fushman | ............... | G06Q 30/02 |

(Continued)

FOREIGN PATENT DOCUMENTS

| | | | | |
|---|---|---|---|---|
| EP | 0 833 511 A2 | 1/1998 | | |
| JP | 0833511 | * 9/1997 | ............... | H04N 7/16 |
| WO | 2004/038568 A2 | 5/2004 | | |

*Primary Examiner* — Gigi L Dubasky
(74) *Attorney, Agent, or Firm* — Haverstock & Owens LLP (57) ABSTRACT

The invention relates to a method of managing access by a transfer device (CL1&CL3) to a content stored on a content server (SCNT), a transfer device being associated with an identifier, the method being characterized in that it comprises a prior stage including a device (MOB1) requesting authorization to access the content, the authorization request being accompanied by at least one identifier of a transfer device (CL1&CL3) that is authorized to access the content, followed by a step of making available access data (TK/SGN (TK)) for accessing the content, the access data including said at least one identifier (CL1&CL3), and a step of accessing the content, including:

i. a step of the transfer device (CL1) obtaining access data;
ii. the transfer device requesting access to the content, the request including the access data and the identifier of the transfer device originating the request; and
iii. the transfer device receiving the content if the identifier of the transfer device (CL1) originating the transmission corresponds to an identifier authorized to access the content.

4 Claims, 2 Drawing Sheets

(51) Int. Cl.

| | |
|---|---|
| *G06F 21/33* | (2013.01) |
| *H04L 29/06* | (2006.01) |
| *G06F 21/10* | (2013.01) |
| *H04N 21/436* | (2011.01) |
| *H04N 21/4627* | (2011.01) |
| *G06F 21/44* | (2013.01) |
| *G06F 16/43* | (2019.01) |
| *G06F 21/62* | (2013.01) |
| *H04N 21/278* | (2011.01) |
| *H04N 21/6334* | (2011.01) |
| *H04N 21/45* | (2011.01) |

(52) U.S. Cl.
CPC ............ *G06F 21/335* (2013.01); *G06F 21/44* (2013.01); *G06F 21/6218* (2013.01); *H04L 63/0807* (2013.01); *H04N 21/278* (2013.01); *H04N 21/43615* (2013.01); *H04N 21/4627* (2013.01); *H04N 21/6334* (2013.01); *G06F 2221/0704* (2013.01); *H04N 21/4532* (2013.01)

(58) Field of Classification Search
CPC ............ G06F 21/6209; G06F 21/6218; G06F 2221/0704; H04L 63/0807; H04L 41/50; H04N 21/2541; H04N 21/278; H04N 21/43615; H04N 21/4532; H04N 21/04; H04N 21/4627; H04N 21/6334

USPC ....... 725/25, 32, 31; 709/204, 203, 219, 225
See application file for complete search history.

(56) References Cited

U.S. PATENT DOCUMENTS

| | | | | |
|---|---|---|---|---|
| 2003/0187960 | A1* | 10/2003 | Koba ..................... | H04L 29/06 709/219 |
| 2008/0214215 | A1* | 9/2008 | Aaltonen ............ | G06F 16/9577 455/466 |
| 2009/0055891 | A1* | 2/2009 | Okamoto ........... | H04L 63/0227 726/1 |
| 2010/0299758 | A1* | 11/2010 | Hyun ................... | H04L 63/101 726/28 |
| 2012/0017235 | A1* | 1/2012 | Kudelski ........... | H04N 21/2541 725/31 |
| 2012/0017250 | A1* | 1/2012 | Tirasirikul ............... | H04N 7/18 725/85 |
| 2012/0331056 | A1* | 12/2012 | Kim ................... | H04N 21/2541 709/204 |
| 2013/0212610 | A1* | 8/2013 | Hussain ................. | G06Q 30/06 725/23 |
| 2014/0258531 | A1* | 9/2014 | Sarda ................. | G06Q 30/0637 709/225 |
| 2014/0324948 | A1* | 10/2014 | Woo ........................ | H04W 4/60 709/203 |
| 2015/0373016 | A1* | 12/2015 | Gupta .................. | G06F 13/102 726/9 |

* cited by examiner

METHOD OF MANAGING THE RIGHT OF ACCESS TO A DIGITAL CONTENT

TECHNICAL FIELD

The invention relates to a method of managing the right of access to a digital content. The access relates in particular to a media-streaming transfer device. Such a transfer device is interposed between a device from which a request to access a content originates and a playback device; the function of the transfer device is to playback a content remotely on a device other than the device from which the access request originates. Among other functions, the transfer device has the function of accessing the content and of delivering the content to the playback device.

The transfer device may be in the form of an electronic stick (or "dongle") connected to a playback device and provided with a communication function, e.g. of the wireless WiFi type, in order to be able to connect to a network, e.g. a local network. In the examples described below, the above-specified device is a mobile device such as a smartphone or a digital tablet.

STATE OF THE ART

With the development of networks and of mobile devices, it is nowadays possible to play back digital multimedia contents (video, audio, etc.) on a user's mobile device, e.g. a smartphone or a digital tablet.

Nevertheless, in a certain number of situations, and in particular when the user of the mobile device is in a local network, it is more agreeable to play back the multimedia content, e.g. a film, on a TV set or on some other terminal of the local network, e.g. a computer, having a larger screen than the mobile device. The term "playback" is used herein to mean making the content available to the user: viewing, display, sound playback, etc.

It should be recalled that a local network, also referred to as a residential network, is a computer network, with or without wires, that connects together terminals (i.e. computers, print peripherals, playback peripherals, storage peripherals, etc.). A residential network generally includes router equipment, also commonly referred to as a residential gateway or a service gateway, which constitutes an intermediate element for redirecting or "routing" data packets between the various terminals and the networks that are connected thereto. Such a residential network often connects the various terminals together by using WiFi technology. It should be recalled that the term "WiFi" (for Wireless Fidelity) covers wireless transmission technologies enabling wireless computer networks to be created that are based on standards of the IEEE 802.11 family.

Since the screen of a mobile device is often small in size, and since its loudspeakers are of poor quality, it is not agreeable to use it for playing back a multimedia type content. Furthermore, it is awkward to play such contents back on the screen of a mobile device while also using the device for other functions, e.g. such as managing telephone calls, text messages, etc.

It is thus advantageous, from several points of view, to transfer the playing back of the multimedia content to another device, referred to as the "transfer" device.

For this purpose, products have recently become available that enable multimedia contents to be played back on a personal computer (PC) or on a television (TV), while relieving the mobile device of the tasks of decoding, displaying, playing back sound, etc. that are inherent to playing back a digital content.

In this category, there exist devices suitable for playing back in real time digital contents that are made available in the form of streaming, which devices are in the form of an electronic dongle that is connected to a TV set via a multimedia port of the high-definition multimedia interface (HDMI) type. The multimedia content comes from an application, such as for example a progressive downloading application on the Internet wide area network (WAN), such as for example YouTube©, which application is selected by the user on a first terminal (smartphone, tablet, computer, etc.) that is connected to the local network, and is then played back on the TV set via the transfer device.

In that configuration, the main steps in the transfer device are the following, assuming that pairing has been achieved:
  opening a point-to-point communication channel between the portable device and the transfer device;
  the transfer device receiving an identifier of a digital content for playing back; and
  the transfer device accessing the identified content on the content server.

One problem is that a plurality of transfer devices may be available, and it is not always desirable for all of the transfer devices to have access to the selected content, whether for the content provider or for the user. Specifically, the content provider may desire that a subset of transfer devices does not access the content; furthermore, a user, e.g. a father of a family and assuming that each member of the family possesses a transfer device, may desire that only certain members of the family have access to the content, in the manner of a parental control application.

Also, in current systems, when a content is purchased, e.g. via a video on demand application, that content can be consumed only on devices that are specified, e.g. by an operator or by the content provider; for example, if a household has one account, a purchased content should be accessible by devices associated with the account as designated by the provider.

The invention seeks to improve the situation.
The Invention

In a first functional aspect, the invention relates to a method of managing access by a transfer device to a content stored on a content server, a transfer device being associated with an identifier, the method being characterized in that it comprises a prior stage including a device requesting authorization to access the content, the authorization request being accompanied by at least one identifier of a transfer device that is authorized to access the content, followed by a step of making available access data for accessing the content, the access data including said at least one identifier, and a stage of accessing the content, including:
  a step of the transfer device receiving access data from said device;
  a step of the transfer device transmitting a request access to the content, the request including the access data and the identifier of the transfer device originating the request; and
  the transfer device receiving the content if the identifier of the transfer device originating the transmission corresponds to an identifier authorized to access the content.

During the receiving step, the transfer device receives the access data from said device. The invention makes it possible from a device requesting access to designate a destination transfer device, or indeed several destination transfer devices, and to transmit the access data from a device to the transfer device(s), at the desired time. From the access data, the transfer device has all of the information needed for accessing the content. If the access data is valid, then access will be authorized and transfer of playback will be authorized. On the contrary, if the data is not valid, access will be refused.

It can thus be understood in the context of a group of users, e.g. a family, having a set of transfer devices, the invention enables access to be restricted to a subset of the transfer devices, thereby implementing parental control.

Also, the fact that the access data includes at least one transfer identifier means there is no need subsequently to call the issuer of access data once again. The entity verifying access rights, e.g. the content server, receives sufficient data from the transfer device for verification purposes, namely the identifier of the transfer device, together with the access data, which itself includes the transfer devices that are authorized.

As can be seen below, in an implementation, the access data includes an identifier of a content, an identifier of a transfer device that was supplied while making the request, and an electronic signature of said at least one identifier as calculated by means of a signature key. By means of the signature present in the access data, this implementation makes it possible to verify all of the access data prior to authorizing access to the content, and in particular to verify the integrity of the identifier(s) of authorized transfer device(s). Specifically, if the integrity of the data is established, then a match between the identifier of the transfer device that originated the access request and an identifier of a transfer device that has been authorized suffices to authorize access to the content identified in the access data. The access data is thus protected against theft.

In a first particular implementation of the invention, which may be implemented as an alternative or together with the above implementation, the prior step of requesting authorization and the transmission step are performed by two distinct devices. This implementation makes it possible to request authorization from a first device and to transmit the access data to a transfer device from a different device. For example, in a family, the father may request access authorization from one device, and thereafter the access data may be used by another device, e.g. by his daughter's device, for transmission to a transfer device.

In a second particular implementation of the invention, which may be implemented as an alternative or together with the above implementation, the request for authorization is accompanied by at least one transfer device identifier selected from a list of transfer device identifiers. By way of example, the list of transfer device identifiers relates to a single group of users. If the group is a family, selecting one (or more) identifiers from a list makes it possible to restrict access to the transfer device in question; the other transfer devices cannot access the content in question. Returning to the above example, the father of the family may also specify in the authorization request which device(s) is/are to be entitled to transmit the data to a transfer device.

By way of example, the group of users may be the users of a local network managed by a gateway, e.g. a residential gateway.

In a second particular implementation of the invention, which may be implemented as an alternative or together with the above implementation, the receiving step is preceded by a device (MOB1) transmitting access data to the transfer device, and in that the device informs the content server that said transmission step has been performed. In this way, the access data is activated only when transmitted to a transfer device. In other words, if a content server receives access data without receiving information about how the access data is shared with a transfer device, it will not authorize access to the content.

In a second functional aspect, the invention relates to a management method for managing an authorization request made by a device and for authorizing access to a content stored on a content server, the content being for accessing by at least one transfer device, a transfer device being associated with an identifier, the method being characterized in that the authorization request is accompanied by at least one identifier of a transfer device authorized to access the content. The method further comprises:

a step of receiving data for accessing the content; and a step of transmitting the access data to at least one transfer device.

In an implementation, the method further comprises a step of the device receiving the authorization.

In a third functional aspect, the invention relates to a management method for managing access by at least one transfer device to a content stored on a content server, the method being characterized in that it comprises the following steps:

a step of receiving access data previously obtained by a device, the access data including at least one transfer device authorized to access the content;

a step of the transfer device requesting access to the content, the request including the access data and the identifier of the transfer device originating the request; and a step of the transfer device receiving the content if the identifier of the transfer device originating the request corresponds to an identifier authorized to access the content.

In a first hardware aspect, the invention relates to a device including a module for requesting authorization to access a content stored on a content server, the content being for accessing by at least one transfer device, a transfer device being associated with an identifier, the device being characterized in that the request is accompanied by at least one identifier of a transfer device authorized to access the content, and in that it further comprises:

a module for receiving access data for accessing the content; and a module for transmitting the access data to at least one transfer device.

In a second hardware aspect, the invention relates to a transfer device suitable for accessing a content stored on a content server, the transfer device being characterized in that it comprises the following modules:

a module for receiving access data previously obtained by a device, the access data including at least one transfer device authorized to access the content;

a module for transmitting a request access to the content, the request including the access data and the identifier of the transfer device from which the request originates; and a module for enabling the transfer device to receive the content if the identifier of the transfer device originating the request corresponds to an identifier authorized to access the content.

In a third hardware aspect, the invention relates to a computer program suitable for being performed on a device as defined above, the program comprising code instructions that, on being executed by a processor, perform the steps of the method defined above relating to the first functional aspect.

In a fourth hardware aspect, the invention relates to a computer program suitable for being performed on a transfer device as defined above, the program comprising code instructions that, on being executed by a processor, perform the steps of the method defined above relating to the second functional aspect.

The above-mentioned programs may be of any kind. They may be downloaded from a communications network, and/or they may be stored on a computer-readable medium.

The invention can be better understood on reading the following description, which is given by way of example and made with reference to the accompanying drawings, in which.

DETAILED DESCRIPTION OF AN EMBODIMENT ILLUSTRATING THE INVENTION

Figure 1:
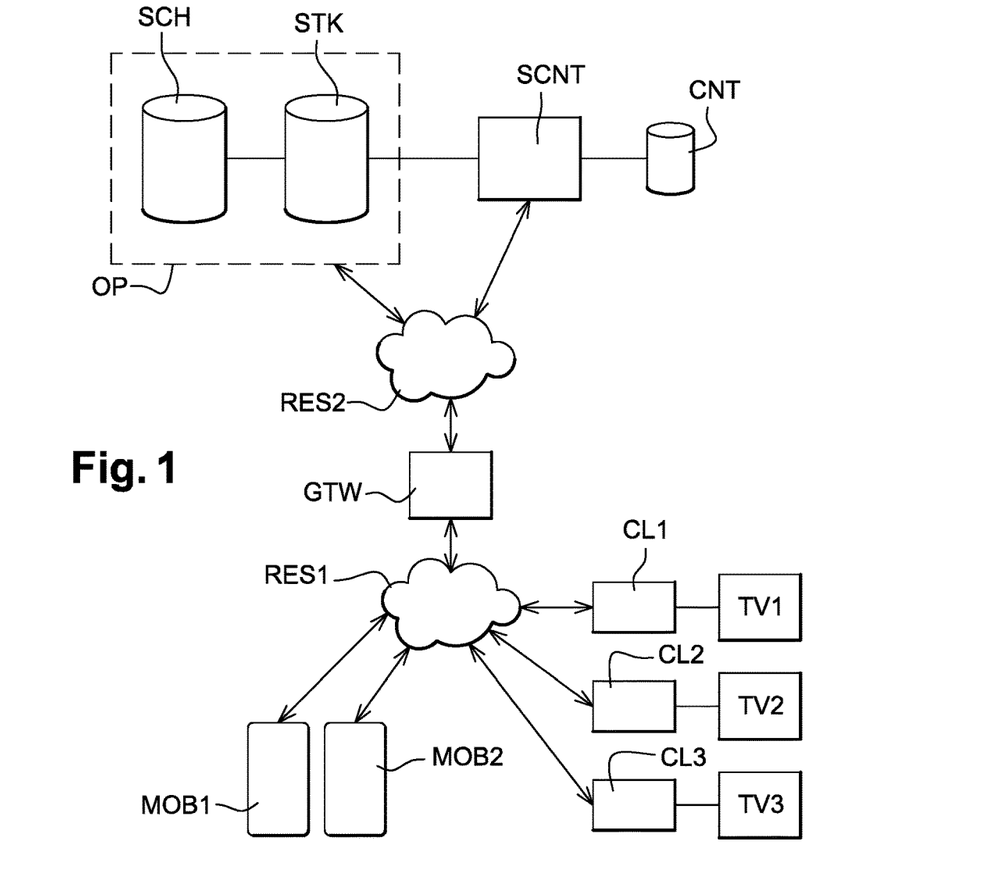
FIG. 1 shows a computer system illustrating an embodiment of the invention.

FIG. 1 shows a system SYS comprising:
A signature server SSIG suitable for signing data;
A ticket server STK suitable for delivering access rights to a content, referred to below by the term "ticket";
A content server SCNT suitable for delivering contents;
Devices MOB1 and MOB2 represented by two mobile devices, specifically smartphones; and
At least one transfer device; in this example a plurality of transfer devices CL1-CL3, serving in particular to give access to contents for playing back on respective playback devices TV1-TV3.

In this example, the signature and ticket servers are situated in the same network belonging to a single operator OP; the operator is in charge of the accounts of the mobile devices MOB1-MOB2 and of the transfer devices CL1-CL3.

As explained in the introduction of the application, a transfer device is in the form of an electronic stick ("dongle") that is connected to the playback device and that is provided with a communication function, e.g. of the WiFi wireless type, so as to be capable of connecting to a communications network, e.g. a local network RES1 managed by a residential gateway GTW.

The above-described servers SSIG and STK are suitable for communicating with the content server via a second network RES2. In this example, this second network is an Internet wide area network (WAN) as contrasted with a local area network (LAN).

The servers can communicate with the gateway GTW via the second network RES2.

In this example, the mobile and transfer devices are suitable for setting up connections with the service gateway GTW that is connected to the second network RES2.

By way of example, the first network RES1 is an Internet protocol (IP) local network, and the second network is an asymmetric digital subscriber line (ADSL) type network.

The content server SCNT hosts in particular contents for making available to devices, and in particular to the devices of the local network RES1. The present example relates to a content server; nevertheless, the server may be split up as a plurality of pieces of equipment, e.g. the contents may be stored in a database that is distinct from the server.

The service gateway GTW includes a WiFi communication function or access point (AP), which enables it to communicate wirelessly with the devices of the local network. This access point includes a bidirectional radio module for transmitting or receiving signals in the local network.

By way of example, a device MOB1 or MOB2 may be a personal computer (PC), a smartphone, a personal digital assistant (PDA), a digital tablet, or indeed a laptop computer, which may optionally be connected to a mobile network (not shown).

By way of example, a playback device is a television set TV.

In this example, each transfer device corresponds to a respective playback device. Naturally, the invention could also be implemented with a transfer device associated with a plurality of playback devices.

An application executing on the mobile device MOB1/MOB2, in this example a TV application for "live" content, i.e. of the broadcast channel type, or else for on-demand content, enables the user to select a multimedia content that is to be played back on a TV set.

The TV set is associated with the transfer device, which, in this example, is connected to an HDMI video port of the TV set and is in the form of an electronic stick (or "dongle").

Once a specific function has been selected on the mobile device (e.g. a key that can be selected by pressing on a touchscreen), the multimedia content is directed to the dongle and can be played back on the TV set; in other words the playback of the content is transferred to the TV set. The dongle can then connect itself to the content server SCN of the WAN network RES from which it recovers the contents directly, possibly with quality or resolution that is greater than the initial quality or resolution of the mobile device (4), and in this example without passing via the mobile device.

In this example, a content is downloaded from the content server SCNT to a transfer device by passing via the service gateway GTW.

It should be observed at this point that transferring the content presents several advantages:
the mobile device can be relieved of a task that consumes a large amount of resources (decoding, displaying video, etc.) thereby allowing it to perform other functions for the user at the same time (e.g. viewing email, processing a text message, etc.);
the quality and/or the resolution of the multimedia content can be higher on the TV set than on the mobile device, thereby improving comfort for the user; and
the mobile device may be used as a remote control for basic functions concerning the content, such as for example stopping playback ("pause"), restarting ("play"), volume control (silence "mute", increase volume "vol+", decrease volume "vol−"), etc.

It is assumed that: during a prior step (not shown), the two pieces of equipment, i.e. the mobile device and the transfer device, are both connected to the local network, i.e. to the service gateway GTW of the local network. In this example, once both pieces of equipment are connected to the network via the service gateway, communication is set up between them. For this purpose, the mobile device begins by discovering (D) the presence on the network of one or more peripherals of this type. This discovery step corresponds to an operation that is well known to the person skilled in the art, which can be implemented in the form of a request in compliance with a local network protocol, e.g. the UPnP standard. It should be recalled that the UPnP standard has the purpose of enabling terminals to connect easily and to communicate simply within a local network. It constitutes a set of communication protocols based on IP protocol and issued by the UPnP Forum. In order to control the terminals of the network, UPnP makes use of control points (CP). A control point conventionally issues discovery messages (MSEARCH) to the various terminals of the network in order to retrieve in return a description of the terminals corresponding to the request. The discovery messages are usually issued from the control point to the terminals in point to multipoint communication mode, which is also known as multicast mode. Terminal equipment compatible with the UPnP standard responds to these request messages, and furthermore it acts on a regular basis to issue presence messages (ALIVE) to indicate that it is active and connected to the network. The control point of the local network, which in this example is situated in the mobile device, uses multicast mode to issue search messages (SEARCH) searching for pieces of equipment of a given type, specifically electronic transfer dongles.

The dongle in question responds to the discovery request. Optionally, the mobile device in question selects one dongle (and thus one associated TV set or PC) from among those it has discovered.

A communication channel known as a "WebSocket" (WS) is set up between the mobile device and the dongle in order to exchange commands and/or data. The Websocket protocol serves to provide bidirectional communication between a client and a server on a network using the hypertext transport protocol (HTTP), which is a client-server communication protocol that has been developed for Internet networks and in particular the web. By extension, WebSocket is a standard covering both a network protocol and a programming interface that can be used by an application on any client or web server. The protocol has been standardised by the Internet engineering task Force (IETF) organization in its specification request for comments (RFC) 6455, and the corresponding programming interface has been standardised by the W3C organization (reference: *The Web Sockets API; W3C Candidate Recommendation* 20 Sep. 2012).

Consequently, when the user selects a content (C) and presses on the redirection key on the touchscreen of the mobile device, the application of the mobile device requests the dongle to launch the application for transferring the playback of the content C as identified by its identifier (C_ID), the identifier is then transformed into a universal resource locator (URL), e.g.:

http://www.myserver.com/C_ID

Thereafter, the dongle accesses the content server SCNT in order to recover the digital content C_ID, e.g. in streaming mode, by using this URL. By definition, "streaming" mode corresponds to downloading multimedia content in continuous manner. The client terminal (i.e. the dongle) acts in a first step to request downloading of a document that describes the access parameters to the service via the HTTP protocol, after which it accesses the content on the content server SCNT and forwards it to the TV playback device, whereupon the service actually begins, i.e. the TV display device can receive and display the content C.

While downloading the content, commands (CM) may also be sent to the dongle (pause, play, fast forward, etc.) and status messages may be received from the dongle (metadata, state of the transfer device, etc.).

Figure 2:
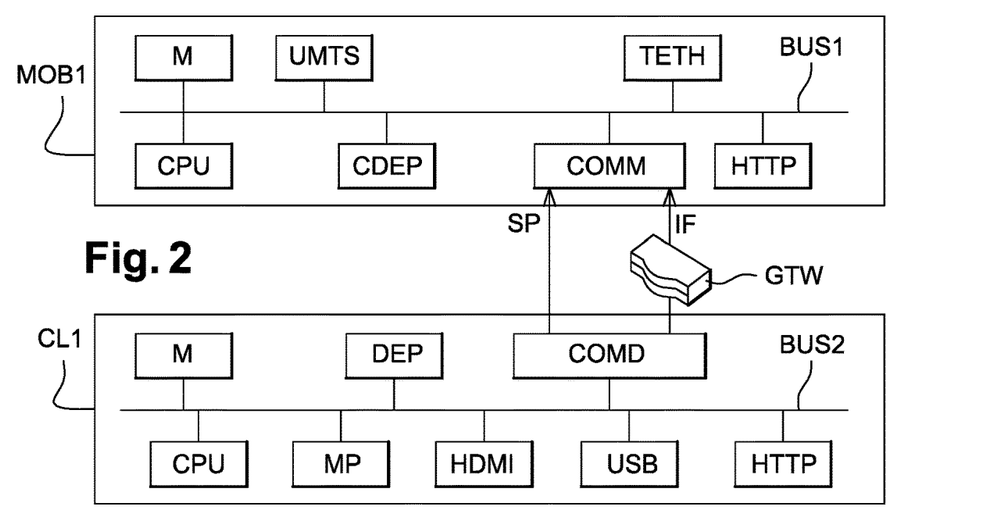
FIG. 2 shows the circuits of a mobile device and of a transfer device.

FIG. 2 shows a hardware architecture for a transfer device connected to a mobile device of the local network.

In conventional manner, the mobile device MOB1 or MOB2 comprises memories M arranged around a processor CPU. The memories may be of the read only memory (ROM) type or of the random access memory (RAM) type, they may be removable or soldered in, etc. The mobile device communicates with the local network RES1 via the communication module (COMM) that enables it to connect over wires (via an ethernet cable) or wirelessly (via a radio channel of WiFi, Bluetooth, Zigbee, etc. type) to the gateway GTW or to some other device of the local network. As described above, in this example, an "ad-hoc" point-to-point communication channel is used for the initial stage of setting up the session between a mobile device and a transfer device. This channel may be of WiFi Direct, Bluetooth, etc. type. Thereafter, in an implementation of the invention, the two devices dialogue in infrastructure mode via the gateway GTW.

In another implementation of the invention it is the mobile device that acts as a gateway in "tethering" mode, and the two devices dialogue in infrastructure mode IF without the service gateway. For this purpose, a mobile device (MOB1 or MOB2) includes an access point or tethering (TETH) mode that enables it to be transformed into a gateway in order to communicate with the second network RES2, which under such circumstances may be the same as the mobile IP network.

In this example, the mobile device also has a radio-mobile module (e.g. UMTS) that enables it to dialogue with a third network that is referred to as the mobile network and that is of the UMTS network type. Finally, it includes a loaded application (CDEP) for controlling the transfer, and in particular for communicating with the transfer device. The CDEP module, which may comprise software and/or hardware, is capable in particular of performing the following actions: selecting one transfer device (from several), requesting the setting up of a point-to-point communication channel with that device for transmitting identifiers of the local network, recovering and storing the identity of the transfer device, selecting a content and transmitting an identifier of the content to the transfer device, controlling the playback of the contents, etc.

A portion of the memory MEM is connected to the WiFi access point and stores, among other things, the identity parameters of the residential gateways to which the mobile device has access, the identity parameters and association parameters of the residential pieces of equipment at the access point when the mobile device is in "router" (tethering) mode (table of identifiers comprising the unique identifiers of the residential terminals that have already been authorized to access the residential network via the access point, routing elements, etc.), the identity parameters of the transfer devices of the local network (names, characteristics, etc.).

It also includes an HTTP type communication module for implementing HTTP type communication, e.g. of the Websocket (WS) type; it should be observed that it is possible for WS type communication to take place over a Bluetooth link.

All of the modules communicate in conventional manner with one another via a data bus BUS1.

In this example, the transfer device also includes memories M arranged around a processor CPU. The memories may be of ROM, RAM, or other type. A portion of the memory M stores, among other things, the identity parameters of the residential gateways to which the transfer device can access, and the identity of the transfer device (e.g.: "dongle_number_36", or "stick#2"). It communicates with the local network RES1 and the mobile device via the communication module (COMD) that enables it in particular to connect wirelessly (WiFi) with the service gateway GTW in infrastructure mode (via the IF connection) or directly with the mobile device (SP connection) in "WiFi direct" or Bluetooth mode. In this example, it is powered via a serial interface of USB type. It also includes:

- an application (DEP) for communicating with a mobile device and for transferring the content. This module is capable in particular of setting up communication, notably private communication, with the mobile device via the communication module COMD, of accepting a request to act instead of the mobile device to search on the network in streaming mode for a content identified by its identifier C_ID, to receive commands for controlling the playback from the mobile device acting as a remote control, and to send it identity, state, etc. information;
- a media player (MP) capable of playing back (receiving, decoding, preparing) content streams and of delivering them to the playback device (TV); the media player includes, amongst other things, a set of transfer devices (audio, video, etc.) suitable for decoding multimedia contents, and an interface for communicating with the mobile device that is suitable for interpreting orders coming from that device (pause, rewind, volume control, etc.);
- an interface module with the playback device (HDMI) capable of interfacing both physically and logically with the TV set in order to transmit thereto the decoded multimedia content (audio and video); and
- an HTTP type communication module.

All of the modules communicate in conventional manner with one another via a data bus BUS2.

A content provider, that manages the content server may desire to restrict the number of accesses to a purchased content. Also, a user, or indeed the content provider, may desire to restrict access to the content to a subset of the transfer devices.

According to the invention, a request to access a content coming from a mobile device is accompanied by an identifier of at least one transfer device. The ticket server responds by transmitting the access data to all or some of the mobile devices. Thereafter, when playback of the content is desired, the transfer device accesses the access data. In this implementation, a mobile device transmits the access data to the transfer device associated with the playback device on which playback is desired.

Figure 3:
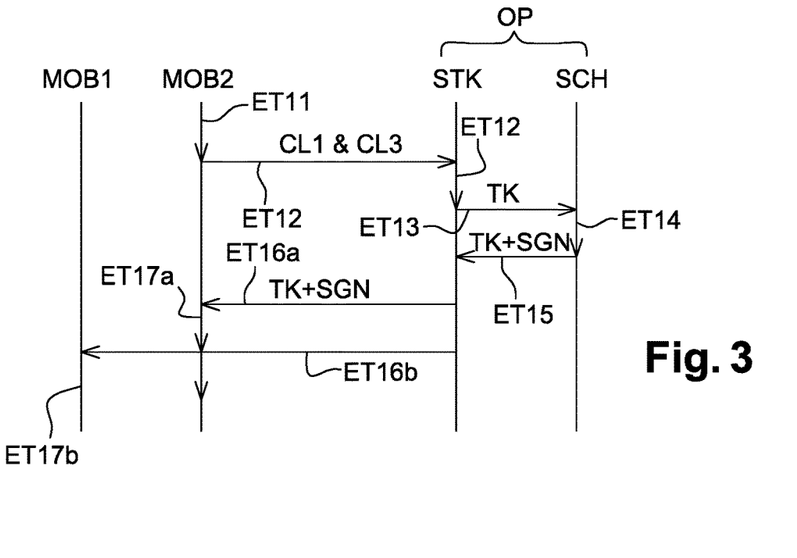
FIG. 3 is a timing chart showing an implementation of a first stage of the method of the invention. This first stage handles ordering a content.
Figure 4:
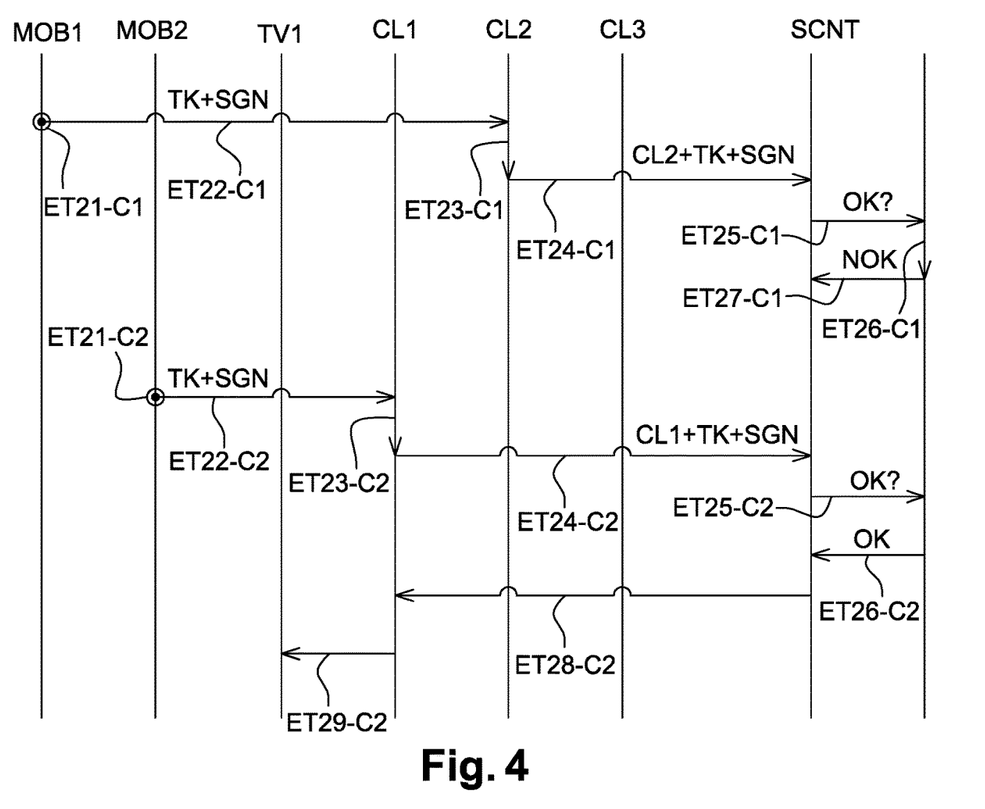
FIG. 4 is a timing chart showing an implementation of a second stage of the method of the invention. This second stage is devoted to the ordered content being accessed by the transfer device, as described below.

An implementation is described below with reference to FIGS. 3 and 4.

In this implementation, it is assumed that the user of the local network possesses two mobile devices. The same user possesses three transfer devices STK1-STK3 respectively connected to three TV sets TV1-TV3.

The user seeks to display on the screen of the playback device a content that has previously been selected on the mobile device: by using an application on the mobile device, in this example a TV application that has previously been supplied by the network operator and/or the service operator, the user selects a multimedia content (audio, video, etc.) that is available on a content server.

In this example, the content server is located in the WAN network, but in another example, it could be situated in a local business network, e.g. in the service gateway (6) or in any other piece of equipment capable of hosting such a content server.

Two stages are described with reference to FIGS. 3 and 4, respectively.

The first stage PH1 is devoted to a request for obtaining one or more access rights.

The second stage PH2 is devoted to accessing the content by the transfer device while using the access right obtained in the first stage.

The first stage PH1 comprises a plurality of steps referenced ET1$n$.

During a first step ET11, a user accesses a catalog of audiovisual contents. In the catalog, the user makes use of the first mobile device MOB1 to select a content C_ID, e.g. a video, and specifies at least one destination, specifically at least one transfer device that will have a right to access the content during the second stage. A validity duration DTE may also be mentioned.

In this example, the destination may be:
- a subset of transfer devices attached to a given gateway GTW; for example a person (belonging to a family) as identified by a particular transfer device;
- all of the transfer devices attached to a given gateway GTW.

During the second step ET12, a request is sent from the first mobile device MOB1 to the ticket server STK. The ticket server creates data TK representative of a purchase, referred to below by the term "ticket" and including:
- the identifier of the ordered content C_ID;
- the identifiers of the transfer devices authorized to access the film; and
- optionally the price and a validity date.

During a third step ET13, the ticket is transmitted to the signature server SSIG.

During a fourth step ET14, the signature server creates an electronic signature SGN (TK) for the ticket by means of a signature key and a signature algorithm, which are known to the person skilled in the art.

The ticket and its signature SGN (TK) are then transmitted to the mobile devices MOB1 and MOB2. To do this, in this example, during a fifth step ET15, the ticket server STK transmits the ticket and the signature SGN (TK) to the ticket server STK, which then transmits them during a sixth step ET16$a$ and ET16$b$ to each of the respective mobile devices MOB1 and MOB2.

During a seventh step ET17$a$ and ET17$b$, the tickets are made available. In this example, they are stored in the memories of the respective mobile devices. In a variant, the tickets could be stored in the network.

In this example, the ticket is transmitted to both mobile devices; nevertheless, in a variant, the ticket could be transmitted to a single selected mobile device. For example, in the first step ET11, one of the mobile devices could be specified as being the destination for the ticket.

At this stage, a ticket may be transmitted to one or more transfer devices.

The second stage PH2 comprises a plurality of steps referenced ET2$n$-Ck (k=1, 2).

Two situations C1 and C2 are described:
- a first situation in which a mobile device transmits the ticket to a transfer device that is not specified in the request described in the first step; and
- a second situation in which a mobile device transmits the ticket to a transfer device specified in the request described in the first step, which device is thus authorized.

Situation 1: Non-Authorized Transfer Device

During a first step ET21-C1, a user of a mobile device, e.g. the first mobile device MOB1, requests transmission of a ticket to the second transfer device. Consequently, during a second step ET21-C1, the application of the mobile device requests the transfer device to launch the transfer application so as to play back the content C identified by the identifier C_ID, and transmits the associated ticket together with the signature SGN (TK). A URL is created including all of this data together with the identifier of the electronic key requesting access to the content:

http://www.myserver.com/
request.html?CL2&C_id&TK&SGN (TK)

the URL includes, amongst other things, the identifier of the dongle CL2 that originated the request, in this example the second dongle.

Thereafter, during a third step ET23-C1, the dongle receives the request and processes the request.

During a fourth step ET24-C1, the dongle attempts to access the content stored on the content server SCNT by using the above-described URL.

At this stage, during a fifth step ET25-C1, the content server transmits at least the ticket TK and the signature SGN (TK) to the ticket server STK.

The ticket server STK knows the key that enables the signature to be verified, in this example a public key, and it verifies the signature. During a sixth step ET26-C1, the ticket server verifies the validity of the ticket TK.

It is assumed here that the signature is valid; since otherwise access to the content would not be authorized. Furthermore, the transfer device that originated the request for access is the second device; this device is not a device specified in the ticket. During a seventh step ET27-C1, the ticket server thus informs the content server SCNT that the transfer device is not authorized.

Downloading does not take place.

Situation 2: Authorized Transfer Device

During a first step ET21-C2, a user of a mobile device, e.g. the second mobile device MOB2, requests transmission of a ticket to the first transfer device.

Consequently, during a second step ET21-C2, the application of the mobile device requests the first transfer device CL1 to launch the transfer application so as to play back the content CNT identified by the identifier C_ID, and transmits the associated ticket together with the signature SGN (TK). A URL is created including all of this data together with the identifier of the electronic key requesting access to the content.

The first transfer device CL1 creates a request including a URL of the following type:

http://www.myserver.com/
request.html?CL1&C_id&TK&SGN (TK)

The URL includes, amongst other things, the identifier of the dongle that originated the request, in this example the first dongle CL1.

Thereafter, during a third step ET23-C2, the dongle receives the request.

During a fourth step ET24-C2, the dongle attempts to access the content stored on the content server SCNT by using the above-described URL.

At this stage, during a fifth step ET25-C1, the content server transmits at least the ticket TK and the signature SGN (TK) to the ticket server STK.

It is assumed that the signature server stores a public key making it possible to verify the signature SGN (TK), and possibly also the associated confidence chain. In this configuration, during a sixth step ET26-C2, the ticket server verifies the signature, and consequently the validity of the received ticket TK.

It is assumed here that the signature is valid; since otherwise access to the content would not be authorized. Furthermore, the transfer device that originated the request for access is the first device; this device is a device that is specified in the ticket. During a seventh step ET27-C1, the ticket server thus informs the content server SCNT that the transfer device is authorized.

Downloading takes place from the content server to the first dongle CL1 during an eighth step ET28-C2.

During a ninth step ET29-C2, amongst other things, the video is decoded by the first dongle and transmitted to the television set TV1 in order to be played back thereon.

In this example, the video is downloaded in streaming mode, which by definition corresponds to continuous downloading of multimedia contents. The client terminal (i.e. the dongle) acts in a first step to request downloading of a document that describes the access parameters to the service via the HTTP protocol, then accesses the content on the content server SCNT, transmits it to the TV playback device, and the service then actually begins, i.e. the TV display device can receive and display the content C.

In a variant, during the first step ET21-Cn, the mobile device also informs the content server only of access data to a transfer device. This is a way of activating the ticket TK. Without this activation, the content is not downloaded. This activation constitutes security in addition to the electronic signature.

As mentioned above, the ticket is associated with a signature SGN (TK). The electronic signature makes it possible not only to authenticate the sender of a message, but also to verify the integrity of the message (i.e. that it has not been modified).

It should be recalled that the electronic signature corresponds to encrypting a hash of the data by means of a private key of the signer. The hash of the data is the result of calculation performed using a suitable hashing algorithm, where the most common are the secure hash algorithm (SHA) or the message digest (MD5) algorithm.

More generally, instead of a signature, it is possible in this situation to use any method that makes it possible to guarantee the identity of the signer and to guarantee that the document has not been modified since it was signed by the sender.

It should also be observed that in addition to the signature, the access data may be encrypted by means of a symmetrical or an asymmetrical encryption algorithm, thereby serving to make the access data confidential.

In order to perform the method of the invention, a transfer device comprises the following modules:
  a module for receiving access data previously obtained by a device MOB1;
  a module for requesting access to the content, the request including the access data and the identifier of the transfer device from which the request originates; and
  a module for receiving the content if the identifier of the transfer device CL1 from which the transmission originates is an identifier authorized to access the content.

It is specified at this point that the term "module" may correspond equally well to a software component or to a hardware component or to a set of hardware and software components, a software component itself corresponding to one or more computer programs or subprograms, or more generally to any program element suitable for performing a function or a set of functions as described for the modules in question. In the same manner, a hardware component corresponds to any element of a hardware assembly suitable for performing a function or a set of functions for the module in question (integrated circuit, IC card, memory card, etc.).

The invention claimed is:

1. A management method for managing access by a plurality of transfer devices to a content stored on a content server, the transfer devices being connected to a playback device and being associated with respective identifiers, the method being characterized in that it comprises a prior stage including a requesting device, distinct from said at least one transfer device, requesting through a network authorization to access the content to a server delivering access data, the authorization request being accompanied by a subset of target transfer device identifiers selected, on a requesting device, from a list of target transfer device identifiers that will be authorized to access the content, followed by a step of receiving from the network, by said requesting device, access data, for accessing the content, and a step of storing said access data in said requesting device, the access data including said target transfer device identifiers, and a stage of accessing the content, including:

transmitting the stored access data including said subset of target transfer device identifiers from a requesting device to said plurality of transfer devices;

receiving, by said plurality of transfer devices, access data including said subset of target transfer device identifiers from said requesting device distinct from said transfer devices;

and in a transfer device wishing to access the content, comprising transmitting an access request to the content, the request including the access data received from the requesting device distinct from said transfer device and an originating transfer device identifier that identifies the transfer device originating the access request; and the transfer devices receiving and transmitting the content to the playback device if the originating transfer device identifier of the at least one transfer device, included in the access data originating the transmission corresponds to an identifier value authorized to access the content.

2. A management method according to claim 1, characterized in that the list of target transfer device identifiers relates to a single group of users.

3. A method according to claim 1, characterized in that the receiving access data from said requesting device is preceded by the requesting device transmitting access data to the at least one transfer device, and in that the requesting device informs the content server that said transmission step has been performed.

4. A system comprising a requesting device including a requesting module for requesting, through a network to a server delivering access data, authorization to access a content stored on a content server, the content being for accessing by a plurality of transfer devices, said plurality of transfer devices being connected to a playback device and being associated with respective transfer device identifiers, the requesting device being characterized in that the request is accompanied by the transfer device identifiers of a subset of target transfer device identifiers authorized to access the content, and in that it further comprises:

a processor; and a non-transitory computer-readable memory storing the requesting module, a receiving module and a transmitting module, wherein when executed by the processor:

the receiving module receives, from the network, access data for accessing the content, the access data including said target transfer device identifiers authorized to access the content;

the storing module store the access data; and the transmitting module transmits the access data including said subset of target transfer device identifiers to the plurality of transfer devices;

a transfer device comprising in order to access the content:

a receiving module receives access data including said subset of target transfer device identifiers previously obtained by a requesting device, the access data including a first target transfer identifiers that identify transfer devices authorized to access the content;

a requesting module requests access to the content, the access request including the access data including said subset of target transfer device identifiers and a second identifier that identifies of the transfer device originating the access request; and an enabling module receives the content if the second identifier of the at least one transfer device originating the request corresponds to an identifier value authorized to access the content.

* * * * *